United States Patent
Cambron et al.

(10) Patent No.: US 11,724,449 B2
(45) Date of Patent: Aug. 15, 2023

(54) SUPPLEMENTARY ROTARY AXIS FOR 3D PRINTER

(71) Applicant: Advanced Solutions Life Sciences, LLC, Louisville, KY (US)

(72) Inventors: Scott Douglas Cambron, Louisville, KY (US); Kyle Eli, Louisville, KY (US); Brandon Hanke, Louisville, KY (US)

(73) Assignee: Advanced Solutions Life Sciences, LLC, Louisville, KY (US)

( * ) Notice: Subject to any disclaimer, the term of this patent is extended or adjusted under 35 U.S.C. 154(b) by 128 days.

(21) Appl. No.: 17/030,796

(22) Filed: Sep. 24, 2020

(65) Prior Publication Data

US 2021/0094228 A1    Apr. 1, 2021

Related U.S. Application Data

(60) Provisional application No. 62/906,276, filed on Sep. 26, 2019.

(51) Int. Cl.
*B29C 64/165*    (2017.01)
*B29C 64/241*    (2017.01)
(Continued)

(52) U.S. Cl.
CPC .......... *B29C 64/165* (2017.08); *B29C 64/209* (2017.08); *B29C 64/241* (2017.08);
(Continued)

(58) Field of Classification Search
CPC ... B29C 64/106; B29C 64/165; B29C 64/241; B29C 64/245
See application file for complete search history.

(56) References Cited

U.S. PATENT DOCUMENTS

2015/0197063 A1    7/2015  Shinar et al.
2016/0096323 A1*   4/2016  Fry ...................... B29C 64/245
                                                            425/375
(Continued)

FOREIGN PATENT DOCUMENTS

DE    102018215546 A1 *  3/2020  ........... B29C 64/118

OTHER PUBLICATIONS

Alexandros, Kenich, et al, Lathe-Type 3D Printer, (Abstract only available), XP055247208, URL:http://www.scribd.com/doc/147351838/Lathe-Type 3-Printer#scribd, Jun. 4, 2013 retrieved online from associated with U.S. Appl. No. 14/870,451.*

(Continued)

*Primary Examiner* — Joseph S Del Sole
*Assistant Examiner* — John Robitaille
(74) *Attorney, Agent, or Firm* — Dinsmore & Shohl LLP

(57) ABSTRACT

A 3D printer includes a multi-axis robot arm comprising a deposition end effector, a rotating adjustable print stage comprising a rotary unit and a mandrel, the rotating adjustable print stage configured to rotate the mandrel around a rotation axis, and a control unit. The control unit may be configured to move the robotic arm in a radial dimension and a longitudinal dimension with respect to the mandrel to position the deposition end effector with respect to the mandrel, rotate the mandrel with the rotary unit, and cause the deposition end effector to deposit constituent on the mandrel to form a 3D-printed construct.

20 Claims, 5 Drawing Sheets

(51) Int. Cl.
*B33Y 30/00* (2015.01)
*B33Y 10/00* (2015.01)
*B29C 64/245* (2017.01)
*B29C 64/209* (2017.01)

(52) U.S. Cl.
CPC ............ *B29C 64/245* (2017.08); *B33Y 10/00* (2014.12); *B33Y 30/00* (2014.12)

(56) References Cited

U.S. PATENT DOCUMENTS

| | | | |
|---|---|---|---|
| 2016/0311165 A1* | 10/2016 | Mark | B29C 64/386 |
| 2017/0120519 A1 | 5/2017 | Mark | |
| 2017/0203484 A1* | 7/2017 | Grigoryev | D01D 5/0076 |
| 2018/0065181 A1* | 3/2018 | Mori | B22F 3/162 |
| 2018/0339455 A1 | 11/2018 | Cohen et al. | |
| 2019/0010447 A1* | 1/2019 | Wen | B33Y 40/00 |
| 2020/0384685 A1* | 12/2020 | Crawford | B29C 64/209 |
| 2021/0037908 A1* | 2/2021 | Busbee | B29C 64/209 |

OTHER PUBLICATIONS

International Search Report and Written Opinion for corresponding PCT Application No. PCT/US2020052604 dated Dec. 21, 2020.

\* cited by examiner

SUPPLEMENTARY ROTARY AXIS FOR 3D PRINTER

CROSS-REFERENCE TO RELATED APPLICATIONS

This application claims the benefit of U.S. Provisional Application Ser. No. 62/906,276, filed Sep. 26, 2019, and entitled Supplemental Rotary Axis for Increased Printing Capabilities of Axisymmetric and Non-Axisymmetric Constructs Using a 6-Axis Printing Platform, the entirety of which is incorporated by reference herein.

TECHNICAL FIELD

The present application relates to 3D printing technology and, more specifically, to providing supplementary axes for 3D printers.

BACKGROUND 3D printers may map 3D plans and print 3D constructs utilizing Cartesian coordinates. However, utilizing Cartesian-based routing instructions and 3D printing systems designed to recognize the same may inefficiently route printing heads and other components consuming unnecessary printing time and resources. Methods of printing using alternative coordinate systems and tools particularly suited to utilize such coordinate systems may increase printing efficiency. Accordingly, a 3D printer having a supplemental rotary axis for increased capabilities of axisymmetric and non-axisymmetric constructs using a 6-axis printing platform is required.

SUMMARY

In one embodiment, a 3D printer includes a multi-axis robot arm comprising a deposition end effector, a rotating adjustable print stage comprising a rotary unit and a mandrel, the rotating adjustable print stage configured to rotate the mandrel around a rotation axis, and a control unit. The control unit may be configured to move the robotic arm in a radial dimension and a longitudinal dimension with respect to the mandrel to position the deposition end effector with respect to the mandrel, rotate the mandrel with the rotary unit, and cause the deposition end effector to deposit constituent on the mandrel to form a 3D-printed construct.

In another embodiment, a system for controlling a robotic assembly workstation includes a robotic controller, a user interface, and a 3D printer that includes a multi-axis robot arm comprising a deposition end effector, a rotating adjustable print stage comprising a rotary unit and a mandrel, the rotating adjustable print stage configured to rotate the mandrel around a rotation axis, and a control unit. The control unit may be configured to move the robotic arm in a radial dimension and a longitudinal dimension with respect to the mandrel to position the deposition end effector with respect to the mandrel, rotate the mandrel with the rotary unit, and cause the deposition end effector to deposit constituent on the mandrel to form a 3D-printed construct.

In yet another embodiment, a method of forming a 3D-printed construct includes providing a multi-axis robot arm comprising a deposition end effector, a rotating adjustable print stage comprising a rotary unit and a mandrel, the rotating adjustable print stage configured to rotate the mandrel around a rotation axis, and a control unit including a processor, a memory unit, and one or more machine-readable instructions stored within the memory unit. When executed by the processor, the one or more machine-readable instructions cause the control unit to move the robotic arm in a radial dimension and a longitudinal dimension with respect to the mandrel to position the deposition end effector with respect to the mandrel, rotate the mandrel with the rotary unit, and cause the deposition end effector to deposit constituent on the mandrel to form a 3D-printed construct.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments as disclosed herein are directed to supplementary axes for 3D printers. Generally, 3D printers may print using a robotic arm that is moveable through multiple axes of translation or rotation using multiple degrees of freedom. The robotic arm may move an end effector that may deposit constituent on a print stage to form a 3D-printed construct. However, additional relative motion between the robotic arm and the print stage may be possible. In embodiments described herein, a 3D printer includes a multi-axis robot arm that includes a deposition end effector and a rotating adjustable print stage that includes a rotary unit and a mandrel. The rotating adjustable print stage may be configured to rotate the mandrel around a rotation axis. The 3D printer further includes a control unit that is configured to move the robotic arm in a radial dimension and a longitudinal dimension with respect to the mandrel to position the deposition end effector with respect to the mandrel, to rotate the mandrel with the rotary unit, and to cause the deposition end effector to deposit constituent on the mandrel to form a 3D-printed construct. Accordingly, a supplementary axis is provided to the 3D printer, making constructs printed on the 3D printer more efficient to produce. These and additional features will be described in greater detail herein.

Figure 1:
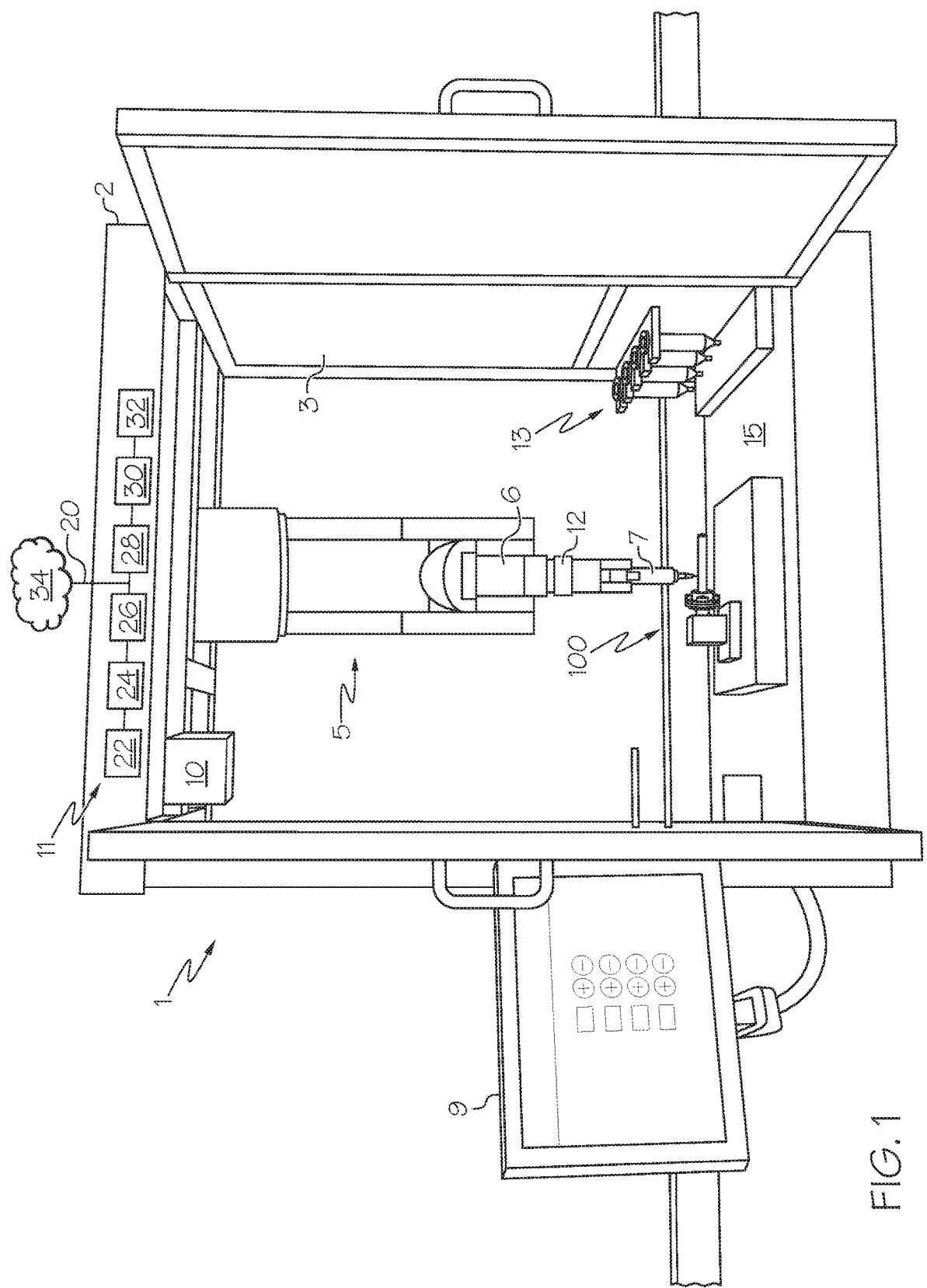
FIG. 1 depicts a robotic assembly workstation including a multi-axis robot and a rotating adjustable print stage, according to one or more embodiments shown and described herein.

FIG. 1 generally depicts a robotic assembly workstation 1 that may include a frame housing 2 including one or more walls 3, a floor 15, and one or more doors (e.g., access doors on a front and/or sides of the workstation). The frame housing 2 may house a multi axis robot 5. The multi axis robot 5 may include, for example, a robotic arm 6 configured for movement through multiple degrees of freedom. The robotic arm 6 may include independent computer-controlled motor joints that work in unison to software code to enable precise motion control of various motions along a preprogrammed robot coordinate system. For example, the robotic arm 6 may be configured for 2-Axis motion, 3-Axis motion, 4-Axis motion, 5-Axis motion, 6-Axis motion, 7-Axis motion, or more. The robotic arm 6 may be configured to control the position of an end effector, such as a deposition end effector 7. In some embodiments, the robotic assembly workstation 1 includes multiple types of end effectors 13 as depicted in FIG. 1.

Figure 2:
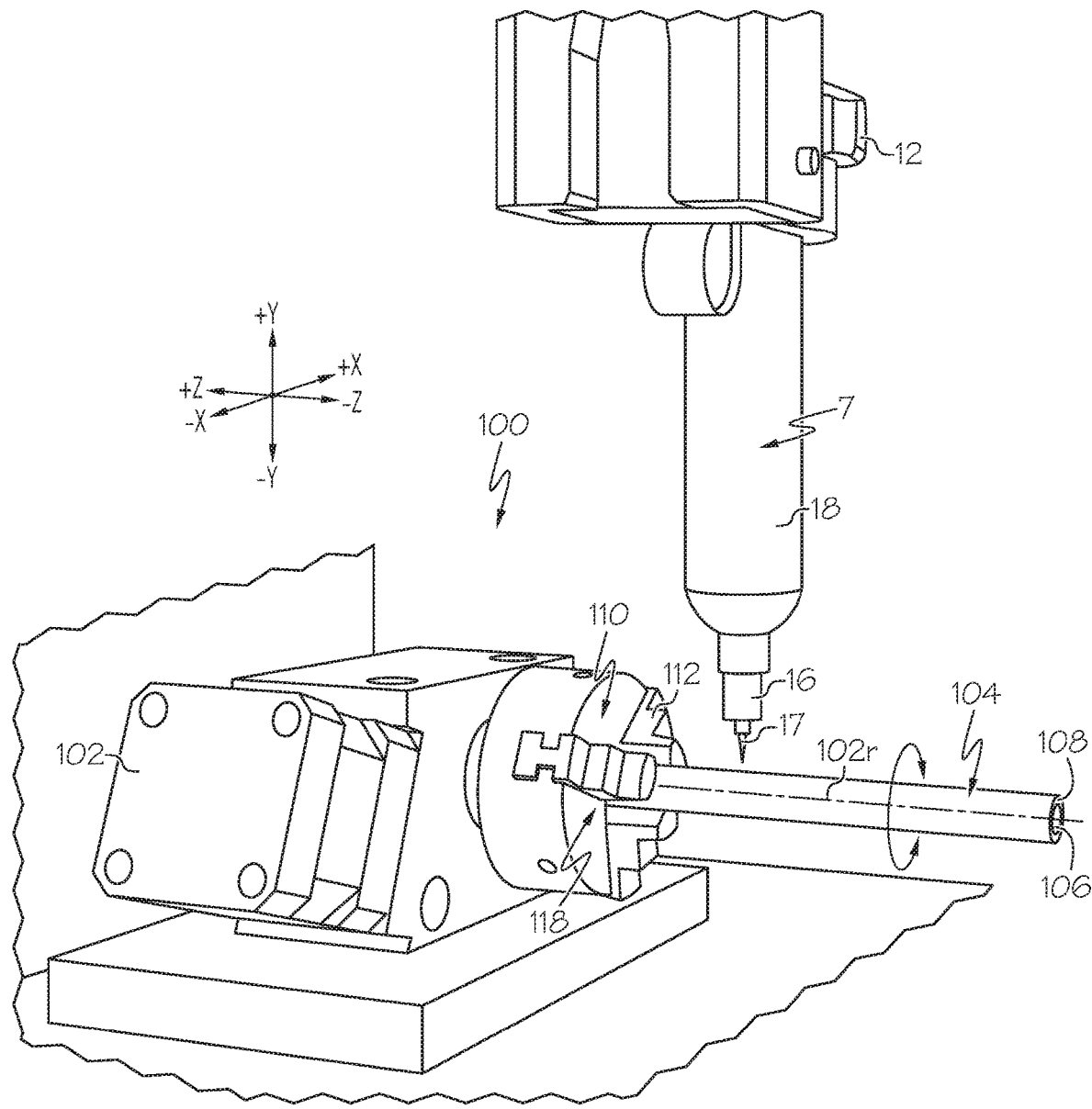
FIG. 2 depicts the rotating adjustable print stage of FIG. 1, according to one or more embodiments shown and described herein.

Referring to FIGS. 1 and 2, the deposition end effector 7 may be coupled to the robotic arm 6 via a coupling mechanism, for example, a universal coupler 12 (FIG. 2) that is configured to couple with various attachments (e.g., tools) to perform various tasks within the robotic assembly workstation 1. Such tasks may include, but not be limited to, 3D printing, picking up objects, moving objects between locations, assembling objects, and the like.

Still referring to FIGS. 1 and 2, the deposition end effector 7 may include multiple components that enable it to deposit constituent. For example, the deposition end effector 7 may include a nozzle 16, a deposition tip such as a deposition needle 17, and a volume 18 for holding constituent. The deposition end effector 7 may be configured to deposit or dispense constituent for printing a 3D-printed construct from the volume 18 (e.g., one or more vials) through the nozzle 16 with the needle 17 onto a print stage to form a 3D-printed construct. Vials may include various types of constituent in liquid and/or solid form that may be used to form 3D-printed constructs of varying composition. In some embodiments, during application the constituent may transform from a solid or static state to a fluid-like state for deposition with the end effector. The deposition end effector 7 may include one or more actuating devices for actuating the powder or granules from the solid state to the fluid-like state. In other embodiments, the constituent may be a liquid within the vial of the deposition end effector. The constituent generally transforms to a solid or static state upon deposition with the deposition end effector 7.

In some embodiments, the vial may be pressurized to force constituent from the volume and onto a print stage. For example, the vial may include a volume that may be fluidly coupled to a pressure source (not shown) (e.g., a pneumatic or hydraulic pressure source). In some embodiments, instead of pneumatic or hydraulic dispensing, a mechanical actuator (e.g., such as a linear actuator or plunger) may be used for material extrusion. In some embodiments, the deposition end effector 7 may utilize gravity as a motivating force to apply constituent. Some embodiments may use a combination of pressure, mechanical, and/or gravity to apply constituent.

The deposition end effector 7 may be adjustable or modular such that different sized vials and/or attachments may be modularly applied within the robotic assembly workstation 1. For example, the deposition end effector 7 may be detachable and may attach and detach via the universal coupler.

As schematically shown in FIG. 2, the deposition end effector 7 may include a charged tip. That is, the needle 17 or other portion of the deposition end effector 7 may be electro-statically charged and/or the deposition end effector 7 may cause the constituent within the deposition end effector 7 to have a charge upon application. The charge of the constituent may correspond with an opposite charge of the print stage. For example, the rotating adjustable print stage 100 may include one or more charged components that electrostatically attract constituent from the deposition end effector 7. As depicted in FIG. 2 the deposition end effector has a positive charge and the rotating adjustable print stage 100 includes a negative charge, but embodiments are not limited to this configuration.

Referring again to FIG. 1, the robotic assembly workstation 1 generally includes a user interface 9 that may be used to interact with and to control a robotic controller 10 via a system 11. The user interface 9 and the robotic controller 10 may be communicatively coupled to one another and other components of the robotic assembly workstation 1. The user interface 9 may generally be used to manually assign instructions to the robotic controller 10 via a graphical user interface (GUI) built by software installed on a hard drive or other computational device (not shown) to control the position of the deposition end effector 7 via the robotic arm 6. The robotic controller 10 may be controlled by a robotic control system. As shown in FIG. 1, one or more of the user interface 9 and the robotic controller 10 may be mounted to the frame housing 2, but it is contemplated that the user interface 9 and/or the robotic controller 10 can be located anywhere such that communication can be established between the robotic controller 10, the user interface 9, and the robotic arm 6.

The user interface 9 may extend from an external surface of the frame housing 2. The user interface 9 may be configured as a touchscreen monitor for a user to interface with, as described herein, and to aid with performance of select functions with the associated robotic assembly workstation 1. The user interface 9 may include a display for providing visual output such as, for example, information, a digital rendering of a construct, graphical reports, messages, or a combination thereof. Interaction with the user interface 9 may give a user access to the software and instructions that allow a user to interact with the robotic controller 10 to control the robotic arm 6 and the rotating adjustable print stage 100 to print a 3D-printed construct.

The robotic controller 10 may be controlled by a system 11 that may implement a computer and software-based method (e.g., using the user interface 9) for depositing constituent to form a solid 3D construct. The system 11 can comprise multiple application servers and workstations. One or more of the robotic controller 10 and the user interface 9 may be communicatively coupled to another user workstation (not shown), such as a computer, for example. The system 11 may be implemented using a wide area network (WAN) or network, such as an intranet or the Internet. Additionally, the robotic assembly workstation 1 may include digital systems and other devices permitting connection to and navigation of the system 11. It is to be understood that lines depicted as connecting the various elements of the system 11 in FIG. 1 indicate communication rather than physical connections between the various components. The system 11 may comprise a communication path 20 for communicatively coupling one or more components.

For example, the communication path 20 may communicatively couple one or more of a modeling component 22, a workflow configuration module 24, one or more hardware processors 26, a non-transitory memory 28, a material database 30, network interface hardware 32, a network 34 (e.g., a cloud server, the Internet, etc.), and the user interface 9 of the robotic assembly workstation 1.

Figure 3:
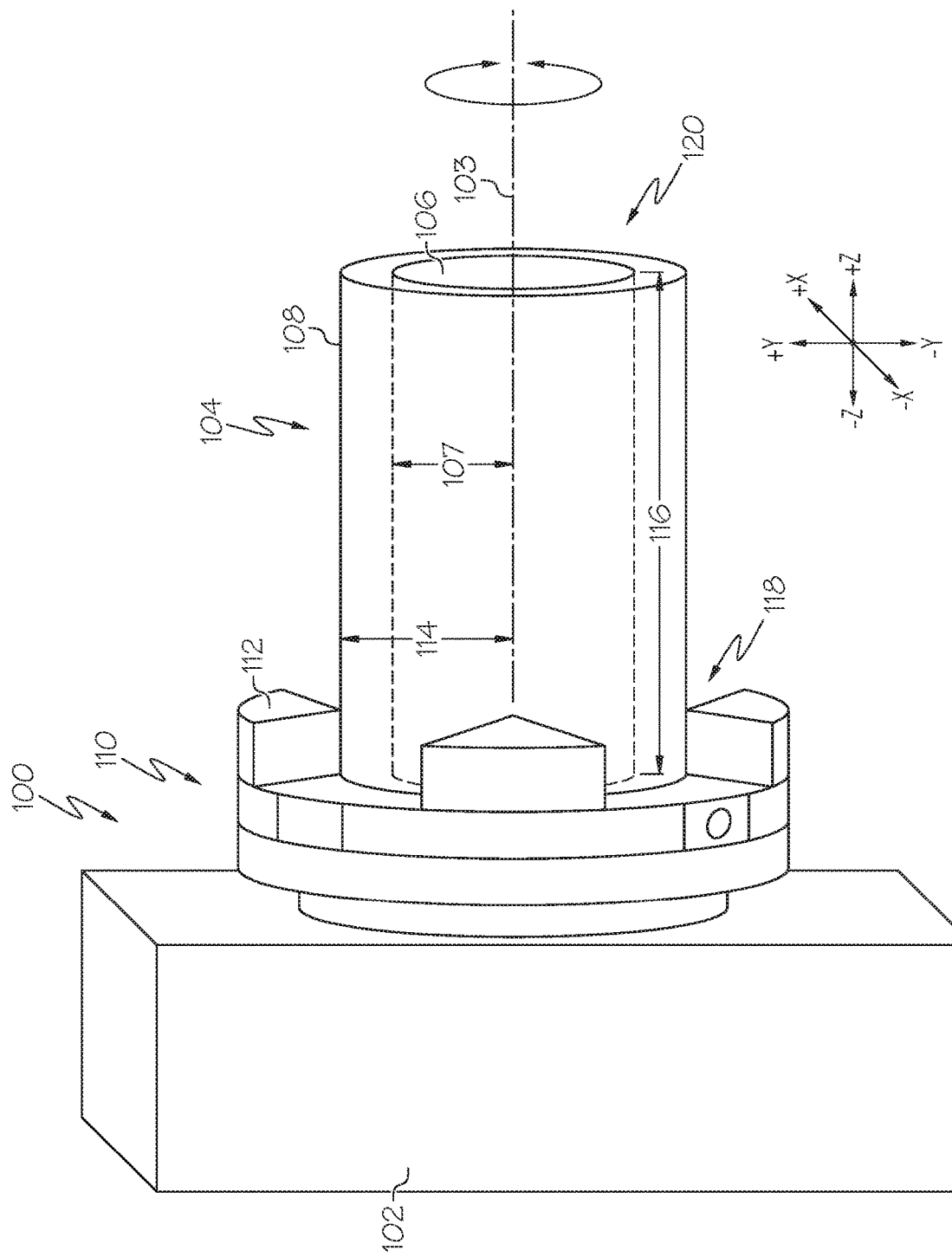
FIG. 3 depicts a schematic representation of the rotating adjustable print stage of FIG. 2 including a mandrel, according to one or more embodiments shown and described herein.

Referring to FIGS. 1, 2, and 3, the robotic assembly workstation 1 further includes a rotating adjustable print stage 100 that is rotated by a rotary unit 102. The rotating adjustable print stage 100 may be an adjustable print and/or assembly stage area for printing and staging one or more 3D-printed constructs. The rotating adjustable print stage 100 may include a chuck 110 with an apparatus for securing the mandrel 104, such as the one or more jaws 112. The one or more jaws 112 may be adjusted to hold a mandrel 104 in place via a friction fit with the mandrel 104 along its outer diameter. The mandrel 104 may be a single unitary piece comprising, for example, glass, stainless steel, or biocompatible plastic. In some embodiments, the mandrel 104 may be, for example, a soluble (e.g., water soluble or similar) material that may dissolve from a printed construct as described in greater detail herein. In other embodiments, the mandrel 104 may be comprised of multiple pieces as will be described in greater detail below. In some embodiments, the chuck 110 may incorporate a collet system or precision collet system that may hold a precision collet.

The rotary unit 102 may be any controllable motor configured to rotate about an axis. For example, the rotary unit 102 may comprise a stepper motor, a brushless DC motor, or the like. In some embodiments, the rotary unit 102 may incorporate a mechanical rotational reducer between the motor and the chuck 110 (e.g., planetary gearhead, pulley assembly, worm gear drive, etc.) that may reduce the rotation of the motor with respect to the chuck 110. The rotary unit 102 may rotate the mandrel 104 around a rotation axis 103 (FIG. 3) in a clockwise or a counter-clockwise direction. The rotary unit 102 may rotate the mandrel at any rotational velocity sufficient for the deposition of constituent on the outer diameter of the mandrel 104 to form the 3D-printed construct. Embodiments of the robotic assembly workstation may include a rotary unit 102 with a variable speed. The rotational speed may be varied, for example, such that the rate of deposition onto the construct changes. The speed and direction of rotation may be controlled by the robotic controller 10, for example.

The rotating adjustable print stage 100 includes the mandrel 104. In various embodiments, the mandrel 104 may be an assembly of one or more subcomponents. For example, the mandrel 104 may be assembled from a base mandrel 106 and one or more sleeves 108 surrounding the base mandrel (although reference will generally be made herein to "sleeve" in the singular for simplicity). The base mandrel 106 and the sleeve 108 may comprise different materials. For example, the base mandrel 106 may comprise glass and the sleeve 108 may comprise a water-soluble material. This may enable quick separation of a completed construct and the mandrel 104 (e.g., a glass mandrel) if the completed construct (not shown) and mandrel 104 are placed in a water bath, for example. The construct and the mandrel will remain but the water-soluble sleeve 108 would dissolve. However, other configurations and applications of base mandrel 106 and sleeve 108 combinations are considered.

For example, various combinations of base mandrel 106 and sleeve 108 may be combined to form features internal to the 3D-printed construct. For example, a 3D-printed construct with a hollow inner cavity. Further, it is to be understood that not all mandrels 104 include a sleeve.

Referring to FIG. 1, robotic assembly workstations 1 may be fitted with one or more bolts, screws, clips, quick releases, or other fastening mechanisms for conveniently removing the rotating adjustable print stage 100 from the robotic assembly workstation 1 and replacing it with a different component with various characteristics and/or functionality thereby increasing the modularity of the robotic assembly workstation 1. For example, the rotating adjustable print stage 100 may be removably coupled to the floor 15 of the robotic assembly workstation 1 using clips or pins to make it quickly releasable from the floor 15. A user may replace the rotating adjustable print stage with a different rotating adjustable print stage with different characteristics or a different component. The system 11 may recognize and adapt to the new component to create a 3D-printed construct using the new component and the same robotic arm 6. This adaptability may increase the efficiency of the robotic assembly workstation 1.

Similarly, and with reference to FIGS. 1 and 2, in some embodiments, individual components of the rotating adjustable print stage 100 may be modular. For example, one or more of the chuck 110, the jaws 112, the base mandrel 106, and the one or more sleeves 108 may be modular allowing for quick replacement or adaptation of the mandrel 104. For example, a user may replace or adjust a particular chuck 110 and/or the jaws 112 to fit a particular mandrel 104. Or a user may remove a first mandrel and replace it with a second mandrel. The modularity of the components increases the adaptability and programmability of the robotic assembly workstation 1, thereby increasing the efficiency of production of 3D-printed constructs thereon.

As depicted in FIGS. 1 and 2, the rotary unit 102 may generally be configured such that the mandrel 104 has an axis that is generally horizontal with respect to the robotic assembly workstation. That is, the rotation axis 103 of the mandrel may be parallel to the floor 15 of the robotic assembly workstation. Thus, the deposition end effector 7 may generally move in the +/−Z direction as it moves with respect to the rotating adjustable print stage 100. However, the robotic arm 6 may be configurable to move through the +/−Y and +/−X axes as well, enabling at least 6-axes of motion. Thus, the robotic assembly workstation 1 is configured to print on non-axisymmetric mandrels as will be discussed in greater detail below. Additionally, although depicted generally horizontally, the mandrel 104 may be held at any angle and with any orientation with respect to the robotic arm 6. For example, the rotary unit 102 may hold the mandrel 104 vertically as opposed to horizontally or at any angle as compared to the floor 15 of the robotic assembly workstation.

Referring to FIG. 2, some embodiments of the rotating adjustable print stage 100 and/or the deposition end effector 7 include one or more components for generating an electromagnetic potential between components of the rotating adjustable print stage 100 and the deposition end effector 7. For example, the rotating adjustable print stage 100 may include a charging system for causing the mandrel 104 to carry an electric charge. The charge may be applied to the mandrel 104, for example, through electric wires or other conductive media that may electrically couple with the mandrel 104 through, for example, the chuck 110 and/or the jaws 112 of the rotating adjustable print stage 100. The mandrel 104 may be, for example, capable of holding an electric, electromagnetic, and/or magnetic charge. Accordingly, in some embodiments, the mandrel 104 may comprise a material capable of holding and/or conducting an electric charge. In embodiments, the deposition end effector 7 may be capable of generating an electric charge in the constituent such that the constituent is electromagnetically attracted to a charged mandrel. In one specific embodiment, the deposition end effector 7 may include a positively charged tip, the mandrel 104 may be configured to hold a negative charge, and the cables supplying electric charge to the deposition end effector 7 and the mandrel 104 may be electrically coupled to the deposition end effector 7 and the mandrel 104 from a high voltage power supply.

Still referring to FIG. 2, in some embodiments the deposition end effector 7 may include one or more components for atomizing the constituent for deposition on the mandrel 104. For example, one or more of the volume 18, the nozzle 16, and the needle 17 may include components for atomizing the constituent as it is deposited on the mandrel 104. In some embodiments, the deposition end effector 7 and the rotating adjustable print stage may be configured to generate 3D-printed constructs using electromagnetically charged constituent and atomized spray of constituent. For example, constituent that is atomized may simultaneously be electromagnetically charged such that it is attracted to the mandrel 104. In some embodiments, the deposition end effector 7 may be configured to deposit a low-viscosity spray.

As shown in FIG. 3, the base mandrel 106 has an outer diameter 107 and the sleeve 108 has an outer diameter that may be equivalent with the outer diameter 114 of the mandrel 104. Embodiments including more than one sleeve may have additional sleeve diameters. While the depicted embodiment shows a mandrel 104 that is generally cylindrical in shape, this is not necessary. Mandrels of various sizes and shapes (e.g., axisymmetric and non-axisymmetric) are considered (e.g., conical, etc.) That is, the outer diameter 107 of the base mandrel 106 may be constant or may vary along a length of the base mandrel 106. Similarly, the outer diameter 114 of the mandrel 104 (and any sleeves comprising the mandrel) may be constant or may vary along a length of the sleeve 108. Generally, the mandrel 104 has a radial dimension defined by the outer diameter 114 and a longitudinal dimension 116 defined by a length of the mandrel 104. The longitudinal dimension 116 may be the length of the mandrel 104 from an anchored end 118 to a workpiece end 120. The mandrel 104 is fastened in place within the robotic assembly workstation 1 by the jaws 112 of the chuck 110. The jaws 112 of the chuck 110 may be adjusted to fit the outer diameter 114 of the mandrel 104 (or a colleting system, e.g., in embodiments utilizing such a colleting system). In some embodiments, the base mandrel 106 and the sleeve 108 may have equal lengths. In other embodiments, the base mandrel 106 and the sleeve 108 may have different lengths.

Generally speaking, the mandrel 104 has a length to diameter (L:D) aspect ratio. Typically, L:D aspect ratios of constructs formed in the robotic assembly workstation 1 may be 8:1 or 10:1 but any L:D aspect ratio is within the scope of the present application. The L:D ratio of the base mandrel 106 and sleeve 108 (if any) may vary. For example, a L:D ratio may be selected based upon a particular material's tendency to bend under its own weight (e.g., "sag") when serving as a mandrel. Additionally, the various components used to hold the different mandrels may be interchanged within the robotic assembly workstation 1 to accommodate mandrels of different sizes and shapes. For example, a chuck similar to the chuck 110 but different in size, shape, or arrangement may be used to hold a mandrel. Chucks are not limited to any particular number of jaws and may use a different means of fastening the mandrel 104 in place.

In some embodiments, one or more of the base mandrel 106 and the sleeve 108 (if included) may have an axis symmetric profile along the rotation axis 103. However, an axis symmetric profile is not required for the mandrel 104 or any/all of its subcomponents. In some embodiments, the mandrel 104 may comprise one or more non-axisymmetric components as will be described in greater detail herein. Such non-axisymmetric components may enable the generation of non-axisymmetric 3D-printed constructs. During operation of the robotic assembly workstation 1, the deposition end effector 7 may deposit constituent along the outer diameter of the mandrel 104 to form a 3D-printed construct. Accordingly, an inner diameter of the completed construct (not shown) may correspond to an outer diameter of the mandrel 104. A mandrel 104 comprising, for example, a sleeve 108 and base mandrel 106 of different lengths or having different external features may be used to create 3D-printed constructs of varying inner diameters or with various internal features. For example, a mandrel 104 having a dissolvable sleeve with a shorter longitudinal dimension than the base mandrel which it surrounds may be used to form a 3D-printed construct with an inner diameter of varying diameter. Additionally, a mandrel 104 having one or more soluble components may enable the production of 3D-printed constructs having one or more voids in the 3D-printed construct.

Figure 4A:
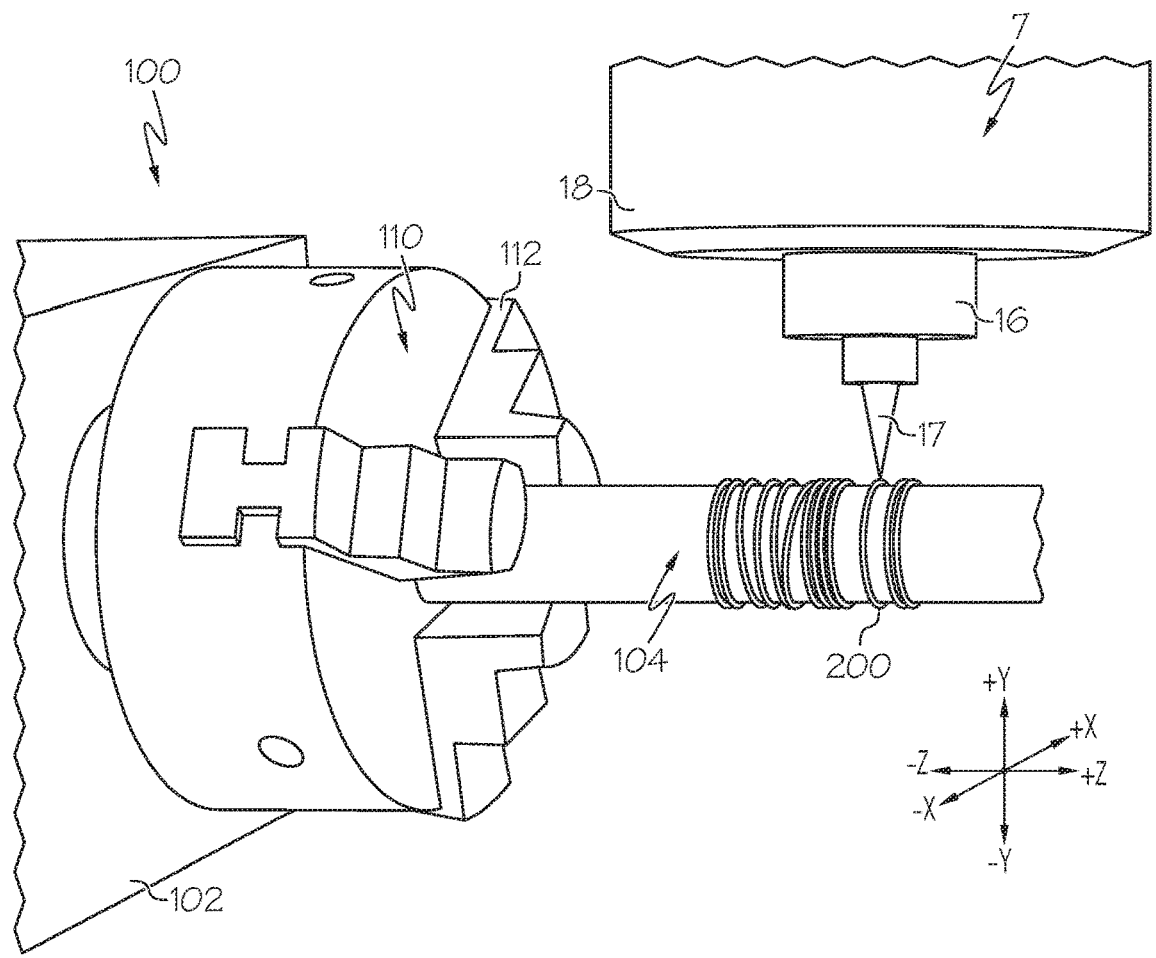
FIG. 4A depicts an end effector depositing constituent on a mandrel of the rotating adjustable print stage of FIG. 2, according to one or more embodiments shown and described herein.
Figure 4B:
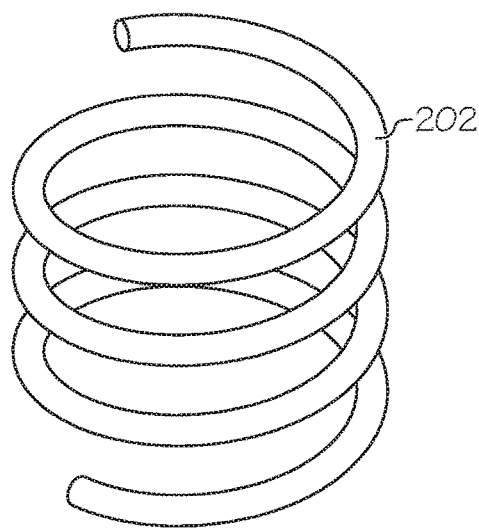
FIG. 4B depicts a 3D-printed construct printed on a rotating adjustable print stage, such as the rotating adjustable print stage of FIG. 4A, according to one or more embodiments shown and described herein.

Referring to FIGS. 4A and 4B operation of the deposition end effector 7 and the rotating adjustable print stage 100 to print a 3D-printed construct 202 is described. FIG. 4A shows the deposition end effector 7 depositing constituent on the mandrel 104. The mandrel 104 may comprise, for example, glass, stainless steel, or biocompatible plastic, and may be held in the chuck 110 by the jaws 112. The chuck 110 is mechanically connected to the rotary unit 102 (not shown) such that the rotary unit 102 can rotate the mandrel 104 around its central axis (not shown). The rotary unit 102 may include, for example, a stepper motor that may be configured to rotate the mandrel 104 in either the clockwise or the counter clockwise direction.

The position of the deposition end effector 7 is controlled with respect to an external surface of the mandrel 104 by the robotic arm 6 (FIG. 1). The deposition end effector 7 is positioned such that it can accurately and consistently deposit constituent on the mandrel 104. With the deposition end effector in the proper location to commence forming the 3D-printed construct 202 as determined by, for example, the system 11 of FIG. 1, the deposition end effector 7 actuates sufficiently such that constituent exits the volume 18 through the nozzle 16 and along the needle 17 and is deposited on the mandrel 104.

As described above, the robotic controller 10 (not shown) is configured such that it simultaneously and synchronously controls the position of the deposition end effector 7 via the motion of the robotic arm 6 and the rotation of the mandrel 104 about the rotation axis 103 (FIG. 3) via the rotary unit 102. Rotation of the mandrel 104 about the rotation axis 103 supplements the motion of the robotic arm 6 giving the robotic assembly workstation 1 additional capability and flexibility of motion to efficiently print constructs. That is, instead of requiring the deposition end effector 7 to circle the mandrel 104 repeatedly, the deposition end effector 7 can remain stationary or move through fewer coordinate locations to form complex structures on the surface of the mandrel 104.

FIG. 4B shows an example construct printable using the supplementary rotary axis. The example construct is a helical construct 202 that was printed using the supplementary rotary axis provided by the rotating adjustable print stage 100 (FIGS. 1 and 2). The helical construct 202 can be printed with minimal motion of the robotic arm 6 (FIG. 1). Referring to both FIGS. 4A and 4B, the deposition end effector 7 needs only move in the +/−Z direction while the mandrel 104 is rotated via the rotary unit 102 min order to deposit sufficient constituent on the mandrel 104 to form the helical construct 202. Accordingly, the rotation axis 103 increases the efficiency of forming a 3D-printed construct.

Figure 5:
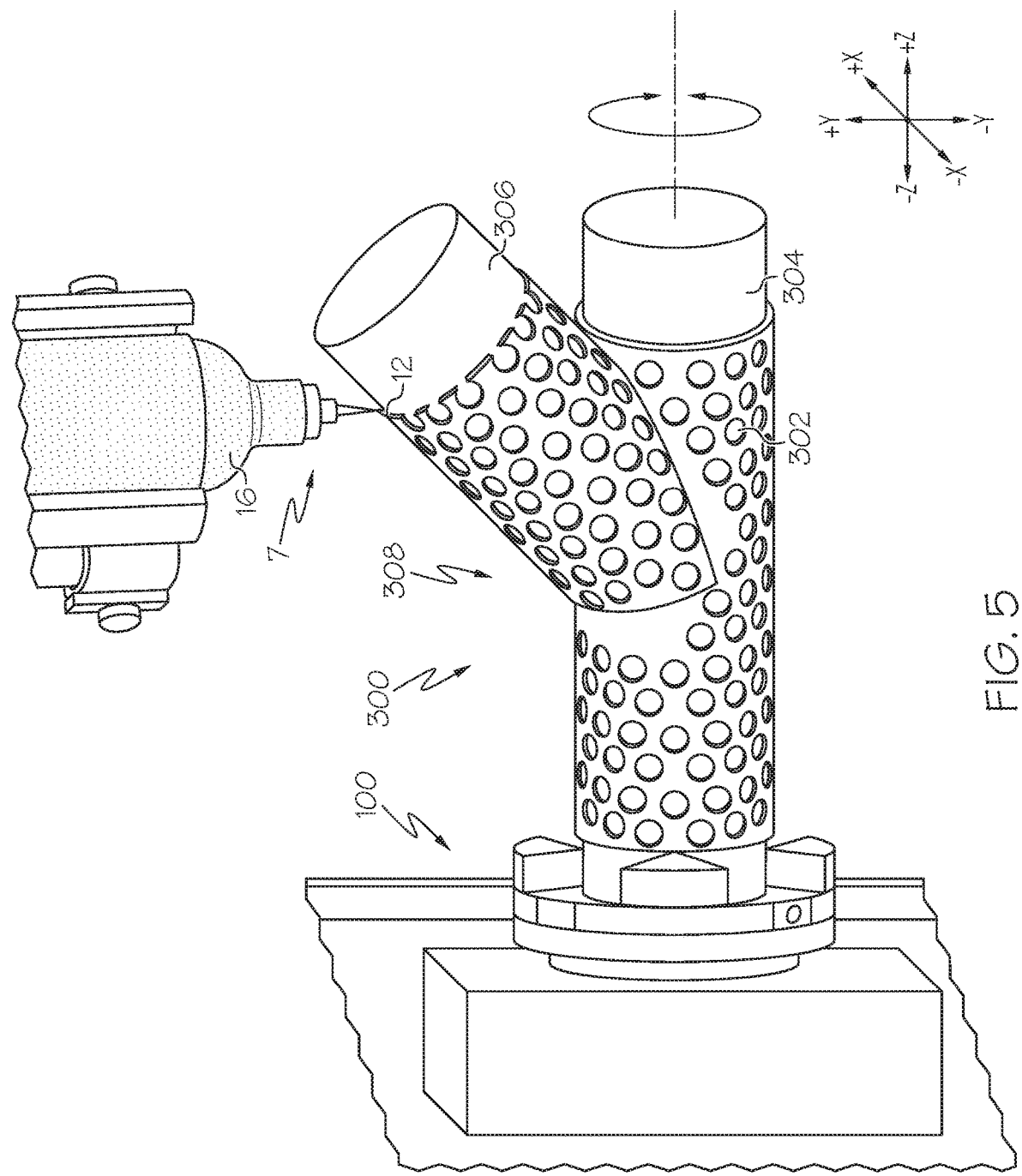
FIG. 5 depicts an end effector creating a 3D-printed construct on a mandrel of the rotating adjustable print stage of FIGS. 1 and 2, according to one or more embodiments shown and described herein.

Referring to FIG. 5, an example of a non-axisymmetric 3D-printed construct is shown. The example shows a stent 300 with a non-axisymmetric, y-shape profile. The stent 300 includes multiple perforations 302. The y-shape of the stent 300 is formed by depositing constituent on a y-shaped mandrel 308 that includes a base structure 304 and a branch 306. The rotational orientation of the y-shaped mandrel 308 may be controlled about the axis 320 to position the y-shaped mandrel 308 with respect to the deposition end effector 7 such that the deposition end effector 7 can deposit constituent on the y-shaped mandrel 308 to form the stent 300. The y-shaped mandrel 308 may comprise, for example, a soluble material such that when generation of the stent 300 on the outer surface of the mandrel 308 is complete, the mandrel 308 can be dissolved, leaving only the stent.

Referring to FIGS. 1 and 5, a user may upload plans to the system 11 using the user interface 9. The plans may include detailed code that may control the position and orientation of the deposition end effector 7 and the mandrel 308 as controlled by the robotic arm 6 and the rotating adjustable print stage 100, respectively. Based on the plans, the robotic arm 6 may position the deposition end effector 7 to deposit constituent on the outer surface of the mandrel 308. As the deposition end effector 7 deposits constituent, the rotating adjustable print stage 100 may rotate the mandrel 308. The deposition end effector 7 may stop depositing constituent at the appropriate times to form the perforations 302 and recommence deposition of constituent based on the uploaded plans. As the mandrel 308 is rotated and constituent is deposited, the stent begins to form. The deposition end effector 7 will slowly move in the +Z direction depositing, stopping and starting the deposition of constituent on the mandrel 308 to form the perforations. The stent 300 will begin to form as successive layers of constituent are placed on the mandrel 308 in the X-Y plane along the Z axis. Once the deposition end effector 7 has formed the stent 300 up to the bend in the mandrel 308, the robotic arm 6 will move the deposition end effector in the +Y direction such that it can deposit constituent on the outer surface of the branch 306. Because the robotic arm 6 is configurable to move the deposition end effector 7 to any position or orientation in the three-dimensional Cartesian plane (i.e., a six-axis robotic arm), the robotic arm 6 can orient deposition end effector 7 to any location necessary to form the stent 300.

Once the stent 300 is complete, the user may loosen the jaws 112 of the chuck 110 releasing the stent 300 and the mandrel 308. The user may place the mandrel/stent combination in a solvent (e.g., water). Because the mandrel 308 is soluble, the mandrel will dissolve, leaving only the stent 300.

It should now be understood that 3D printers may print using a robotic arm that is moveable through multiple axes of translation or rotation using multiple degrees of freedom and that the robotic arm may move an end effector that may deposit constituent on a print stage to form a 3D-printed construct. Relative motion between the robotic arm and the print stage using a supplementary rotary axis may be possible. A 3D printer may include a multi-axis robot arm that may include a deposition end effector and a rotating adjustable print stage that may include a rotary unit and a mandrel. The rotating adjustable print stage may be configured to rotate the mandrel around a rotation axis. The 3D printer may further include a control unit that is configured to move the robotic arm in a radial dimension and a longitudinal dimension with respect to the mandrel to position the deposition end effector with respect to the mandrel, to rotate the mandrel with the rotary unit, and to cause the deposition end effector to deposit constituent on the mandrel to form a 3D-printed construct. Accordingly, the 3D printer is provided a supplementary rotary axis, making constructs printed on the 3D printer more efficient. Thus, providing improved 3D printing efficiency and quality.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A 3D printer comprising:
   a multi-axis robot arm comprising a deposition end effector;
   a rotating adjustable print stage comprising a rotary unit and a mandrel, the rotating adjustable print stage configured to rotate the mandrel around a rotation axis; and
   a control unit configured to:
   move the robotic arm in a radial dimension and a longitudinal dimension with respect to the mandrel to position the deposition end effector with respect to the mandrel;

rotate the mandrel with the rotary unit; and cause the deposition end effector to deposit constituent on the mandrel to form a 3D-printed construct, wherein the mandrel comprises a negative electrical charge and a deposition tip of the deposition end effector comprises a positive electrical charge, such that constituent deposited by the deposition end effector is electromagnetically attracted to the mandrel.

2. The 3D printer of claim 1, wherein the mandrel comprises: a base mandrel; and one or more sleeves.

3. The 3D printer of claim 2, wherein one or more of the base mandrel and the one or more sleeves are soluble.

4. The 3D printer of claim 1, wherein the multi-axis robot arm is a 6-axis robot arm.

5. The 3D printer of claim 1, wherein the mandrel comprises one or more of glass, stainless steel, and biocompatible plastic.

6. The 3D printer of claim 1, wherein the mandrel is axisymmetric.

7. The 3D printer of claim 1, wherein the mandrel is non-axisymmetric.

8. The 3D printer of claim 1, wherein the deposition end effector is configured to atomize constituent for deposition on the mandrel.

9. The 3D printer of claim 1, wherein the rotating adjustable print stage is a modular print stage that is configured to be removable from the 3D printer.

10. A system for controlling a robotic assembly workstation, the system comprising:
    a robotic controller;
    a user interface; and
    a 3D printer comprising:
        a multi-axis robot arm comprising a deposition end effector;
        a rotating adjustable print stage comprising a rotary unit and a mandrel, the rotating adjustable print stage configured to rotate the mandrel around a rotation axis; and
        a control unit configured to:
            move the robotic arm in a radial dimension and a longitudinal dimension with respect to the mandrel to position the deposition end effector with respect to the mandrel;
            rotate the mandrel with the rotary unit; and
            cause the deposition end effector to deposit constituent on the mandrel to form a 3D-printed construct, wherein the mandrel comprises a negative electrical charge and a deposition tip of the deposition end effector comprises a positive electrical charge, such that constituent deposited by the deposition end effector is electromagnetically attracted to the mandrel.

11. The system of claim 10, wherein the mandrel comprises:
    a base mandrel; and
    one or more sleeves.

12. The system of claim 11, wherein one or more of the base mandrel and the one or more sleeves are soluble.

13. The system of claim 10, wherein the multi-axis robot arm is a 6-axis robot arm.

14. The system of claim 10, wherein the rotating adjustable print stage is a modular print stage that is configured to be removable from the 3D printer.

15. The system of claim 10, wherein the mandrel is non-axisymmetric.

16. The system of claim 15, wherein the mandrel is axisymmetric.

17. A 3D printer comprising:
    a multi-axis robot arm comprising a deposition end effector;
    a rotating adjustable print stage comprising a rotary unit and a soluble mandrel coupled to the rotary unit, the rotating adjustable print stage configured to rotate the mandrel around a rotation axis; and
    a control unit configured to:
        move the robotic arm in a radial dimension and a longitudinal dimension with respect to the mandrel to position the deposition end effector with respect to the mandrel;
        rotate the mandrel with the rotary unit; and
        cause the deposition end effector to deposit constituent on the mandrel to form a 3D-printed construct.

18. The 3D printer of claim 17, wherein the mandrel is axisymmetric.

19. The 3D printer of claim 17, wherein the mandrel is non-axisymmetric.

20. The 3D printer of claim 17, wherein the multi-axis robot arm is a 6-axis robot arm.

* * * * *